US006603126B2

(12) United States Patent
Yamada et al.

(10) Patent No.: US 6,603,126 B2
(45) Date of Patent: Aug. 5, 2003

(54) UV/FLUORESCENCE DETECTING APPARATUS AND SENSING METHOD THEREOF

(75) Inventors: Hirokazu Yamada, Himeji (JP); Morimasa Joryo, Himeji (JP); Kunihiro Ryo, Himeji (JP)

(73) Assignee: Glory Ltd., Hyogo (JP)

( * ) Notice: Subject to any disclaimer, the term of this patent is extended or adjusted under 35 U.S.C. 154(b) by 0 days.

(21) Appl. No.: 10/020,454

(22) Filed: Dec. 11, 2001

(65) Prior Publication Data

US 2002/0079454 A1 Jun. 27, 2002

(30) Foreign Application Priority Data

Dec. 26, 2000 (JP) ....................................... 2000-394560

(51) Int. Cl.[7] ................................................ G01N 21/64
(52) U.S. Cl. ..................................... 250/372; 250/461.1
(58) Field of Search ............................. 250/372, 458.1, 250/461.1, 459.1; 73/159

(56) References Cited

U.S. PATENT DOCUMENTS

| | | | | |
|---|---|---|---|---|
| 3,956,630 A | * | 5/1976 | Mellows | 250/461.1 |
| 5,220,169 A | * | 6/1993 | Ninomiya et al. | 250/459.1 |
| 5,760,407 A | * | 6/1998 | Margosiak et al. | 250/461.1 |
| 5,942,759 A | * | 8/1999 | Romano | 250/461.1 |
| 6,369,882 B1 | * | 4/2002 | Bruner et al. | 250/461.1 |
| 6,512,236 B2 | * | 1/2003 | Seville | 250/458.1 |

FOREIGN PATENT DOCUMENTS

| | | |
|---|---|---|
| JP | 6-309546 | 11/1994 |
| JP | 8-185558 | 7/1996 |

OTHER PUBLICATIONS

Abstracts of Japanese Publication Nos. JP 6–309546 and JP 8–185558, prepared by Advance International Patent Office, 1 page.

* cited by examiner

*Primary Examiner*—G. Bradley Bennett
(74) *Attorney, Agent, or Firm*—Ladas & Parry

(57) ABSTRACT

Providing a UV/fluorescence detecting apparatus and a sensing method thereof which is capable of detecting a fluorescent pattern and an ultraviolet reflection light and small and cheap. Further, providing a UV/fluorescence detecting apparatus and a sensing method thereof capable of detecting a fluorescence of a specific color. The UV/fluorescence detecting apparatus includes a sensor comprising a light source portion including an ultraviolet ray LED for emitting ultraviolet ray through an opening window portion and an ultraviolet ray monitor provided beside this ultraviolet ray LED, a light detector portion disposed in a chamber partitioned with a partition plate for receiving an incident light impinging through the opening window portion, the partition plate 6*a* for partitioning between the light source portion and the light detector portion; a transparent body provided on the both opening window portions, a first filter provided on a window portion on projection side of the ultraviolet ray for allowing the light of an ultraviolet ray region thereof to pass through and a second filter provided on a window portion on light receiving side of the incident light for allowing the light of a visible light region thereof to pass through.

12 Claims, 12 Drawing Sheets

● SPECTRAL RESPONSE CHARACTERISTIC

UV/FLUORESCENCE DETECTING APPARATUS AND SENSING METHOD THEREOF

BACKGROUND OF THE INVENTION

1. Field of the Invention

The present invention relates to a UV (ultraviolet)/fluorescence detecting apparatus and sensing method thereof capable of determining a paper sheet quality and so on by projecting ultraviolet ray to a paper or the like and detecting fluorescence excited and ultraviolet ray reflected thereby.

2. Description of the Related Art

Conventionally, there is an apparatus for detecting the quality of a paper sheet by projecting ultraviolet ray to that paper sheet and receiving fluorescence excited and the ultraviolet ray reflected thereby. The structure of such an apparatus employing the ultraviolet ray comprises a UV lamp composed of a cold cathode, an inverter power supply for driving the UV lamp, a photo diode for detecting excited and emitted fluorescent material, a photo diode for monitoring the amount of light from the light source, an optical filter and a photo diode processing circuit (I–V converting circuit).

For example, Japanese Patent Application Laid-open No. 6-309546 A has already disclosed an apparatus having a detecting function for fluorescent material contained in foreign bills and so on. The apparatus described in this publication utilizes a single square rod shaped glass block 21 shown in FIG. 1 as its optical system and its incident face 21*a* and reflection/emission face 21*b* are provided with a filter function, thereby reducing the size of the apparatus and facilitating positioning of the optical system. In the example of FIG. 1, the incident face 21*a* is provided with a film having a filter function which shields visible light component of excited light while permitting only ultraviolet ray region to pass through, this film being formed by vapor deposition or the like. Then, the reflection/emission face 21*b* is provided with a film having a filter function which reflects the excited light while allowing fluorescence generated from a fluorescent material of a detection object "a" to pass through, this film being formed by the vapor deposition or the like. Then, the excited light from the light source 22 is projected onto the detection object "a" like a bill through the detection face 21*c* by using for example, a UV lamp as the light source 22 and its reflectted light is received by a detector 23 through a reflection/emission face 21*b* so as to detect a fluorescent material.

For example, Japanese Patent Application Laid-open No. 8-185558 A has disclosed an apparatus having a detecting function for both fluorescence and reflected ultraviolet ray. In the apparatus described in the above publication, as shown in FIG. 2, ultraviolet ray from the UV lamp 32 is irradiated on the detection object "a" through the window 31 having ultraviolet ray transmissibility and its reflected light is received so as to detect fluorescence and reflected ultraviolet ray with the detector 33. The detector 33 mounted on a printed circuit board 34 is comprised of a sensor for detecting ultraviolet ray and a sensor for detecting fluorescence each composed of a photo diode and the like, a filter for ultraviolet transmission, a visible light transmitting filter, a micro controller and the like. Then, according to this system, a document such as marketable securities and so on is certified based on both the characteristic relating to reflected ultraviolet ray and characteristic about generation of fluorescence.

Because in the above-described conventional example, a cold cathode is utilized as a light emission body of the UV lamp, a small sensor suitable for a spot is difficult to make. If the cold cathode is used, a predetermined amount of light is not obtained just when power is turned on, but brightness increases as the temperature increases. Therefore, it is necessary to carry out correction with a passage of time. Further, if it is always turned on, it needs to be replaced at a short time (about a thousand hours) interval because its service life is short. Further, because an inverter is required to drive the cold cathode and the inverter acts as a noise source, it is difficult to detect a weak fluorescent pattern.

SUMMARY OF THE INVENTION

The present invention has been achieved in views of the above described problems and therefore, an object of the present invention is to provide a UV/fluorescence detecting apparatus which is capable of detecting both a fluorescent pattern and ultraviolet reflected light, and small and cheap, and a sensing method thereof. Further, another object of the present invention is to provide a UV/fluorescence detecting apparatus capable of detecting a fluorescence of a specific color and a sensing method thereof.

The present invention relates to a UV/fluorescence detecting apparatus and a sensing method capable of examining the quality of a paper or the like by projecting ultraviolet ray on the paper and detecting an excited fluorescence and a reflected ultraviolet ray. The above object relating to the invention of the UV/fluorescence detecting apparatus is achieved by provision of a sensor unit comprising: a light source portion including an ultraviolet ray LED for emitting ultraviolet ray through an opening window portion and an ultraviolet ray monitor provided beside the ultraviolet ray LED; a light detector receiving portion disposed in a chamber partitioned with a partition plate for receiving an incident light impinging through the opening window portion; the partition plate for partitioning between the light source portion and the light detector receiving portion; a transparent body provided on the both opening window portions; a first filter provided in a window portion on projection side of the ultraviolet ray for allowing a ultraviolet ray region to pass through; and a second filter provided in a window portion on light receiving side of the incident light for allowing a visible light region to pass through.

Further, each of the invention is more effectively achieved by the following:

The ultraviolet ray monitor is disposed at a position where it receives both a direct light of the ultraviolet ray and a ultraviolet ray reflected by an object for detecting a light emission amount of the ultraviolet ray and a ultraviolet ray reflected by the object. The detected light receiving portion detects a light of wavelength determined to pass through by said second filter. A blue filter is attached to the window portion on the light projection side as the first filter while a red filter is attached to the window portion on the light receiving side as the second filter. The second filter is provided so as to be replaceable with a filter of the color corresponding to light of color which should be detected.

As regards of the UV/fluorescence detecting apparatus and the sensing method, the above object is achieved by a sensing method of the UV/fluorescence detecting apparatus comprising a light source portion including an ultraviolet ray LED for emitting ultraviolet ray through a window portion and an ultraviolet ray monitor provided beside the ultraviolet ray LED at a position for receiving both a direct light of the ultraviolet ray and an ultraviolet ray reflected by the surface of a paper sheet and a light receiving sensor for receiving incident light impinging through a window portion of a chamber partitioned with a partition plate from the light source portion, the sensing method comprising: a step for setting the emitted amount of an initial UV light using the ultraviolet ray monitor; a step for reading and memorizing a set value at a waiting time read by the ultraviolet ray monitor; a step for moving a unit having the sensing portion relative to the surface of a paper sheet; a step for sampling visible light with the light receiving sensor; a step for sampling ultraviolet ray with a sensor in the ultraviolet ray monitor; and a step for processing as an ultraviolet ray reflected by the surface of the paper sheet by subtracting the set value at the waiting time from the sample value of the ultraviolet ray.

DESCRIPTION OF THE PREFERRED EMBODIMENTS

In the UV/fluorescence detecting apparatus according to the present invention, its light source is reduced in size by employing an LED (hereinafter referred to as "ultraviolet ray LED") for emitting ultraviolet ray and the sensor unit is made compact by devising the allocation of its peripheral components. Further, by using a structure in which detection of reflected light of ultraviolet ray from a detection object and monitoring of the amount of light from the light source are carried out with a single light receiving device, the quantity of the peripheral circuits is reduced so as to achieve reduction of the size of the apparatus and production cost thereof. Then, a fluorescence receiving portion detects a fluorescence of a wavelength allowed to pass through by a filter.

Hereinafter, the preferred embodiment of the present invention will be described in detail with reference to the accompanying drawings. Although an example in which the sensor unit is mounted along a transportation path and a paper sheet is carried with a predetermined transportation means as an object for detection will be described here, a case where the sensor unit (or UV/fluorescence detecting apparatus) is moved relative to the paper sheet while the relatively moved paper sheet is treated as the carried paper sheet is also included in the present invention.

Figure 1:
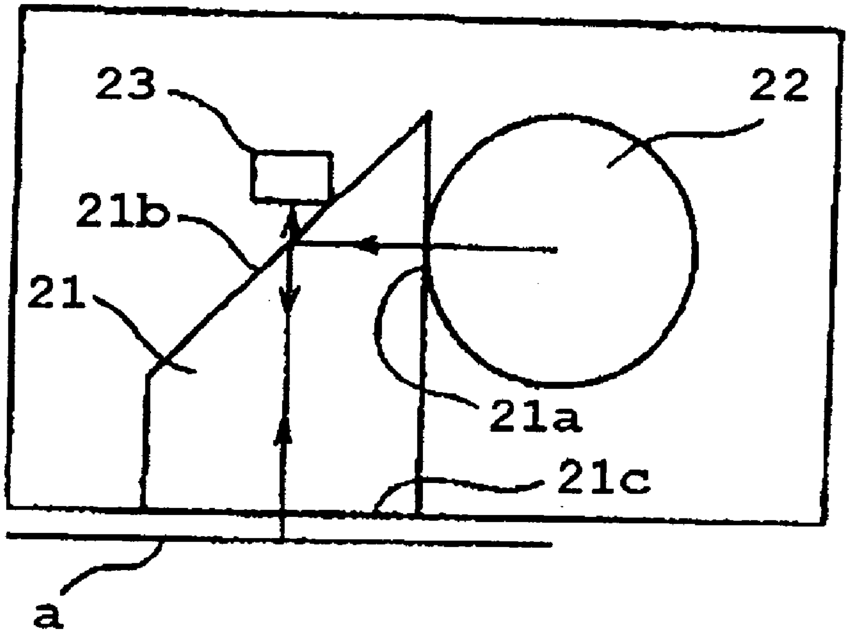
FIG. 1 PRIOR ART
FIG. 1 is a block diagram showing an example of the structure of the sensor unit in a conventional apparatus having a fluorescent material detecting function.
Figure 2:
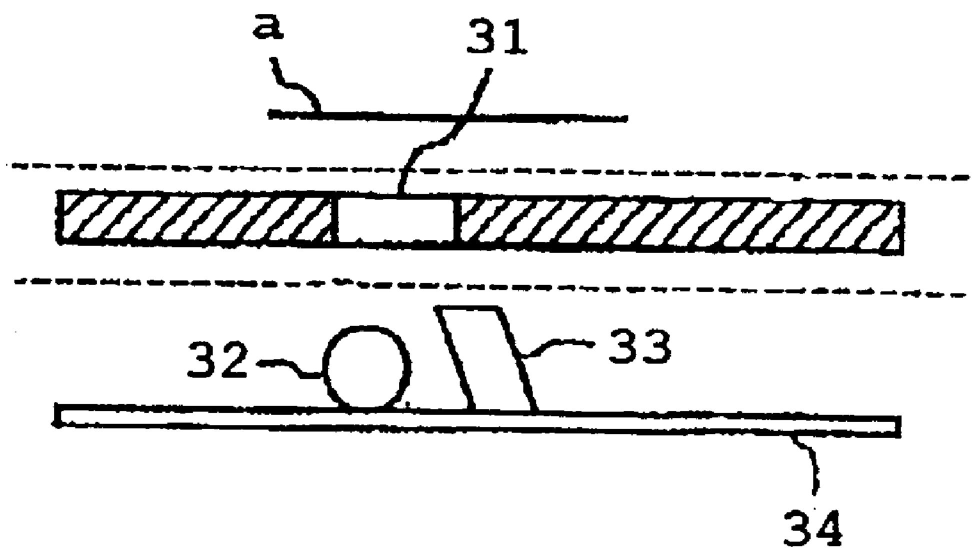
FIG. 2 (PRIOR ART)
FIG. 2 is a block diagram showing an example of the structure of the sensor unit in a conventional apparatus having detection functions for both fluorescence and reflection ultraviolet ray.
Figure 3:
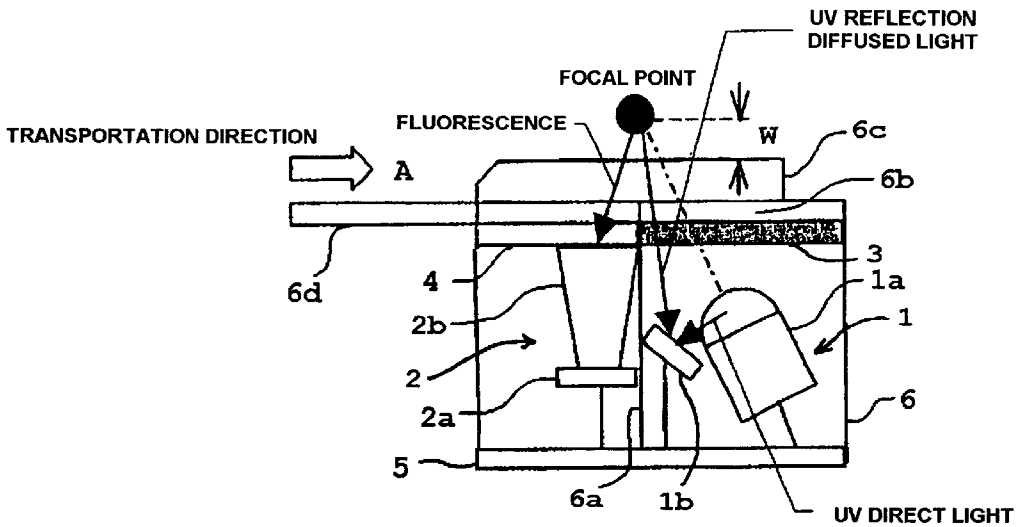
FIG. 3 is a schematic diagram showing a first example of the structure of the sensor portion in the UV/fluorescence detecting apparatus according to the present invention.

FIG. 3 shows a first example of the structure of a sensor portion of the UV/fluorescence detecting apparatus according to the present invention. In FIG. 3, an internal space of the unit case 6 is partitioned to a light source chamber and a fluorescence detecting chamber by a partition plate 6*a* for shielding light including visible light and ultraviolet ray. An opening window portion 6*b* is provided on the side of a path on which a paper sheet is carried and ultraviolet ray is projected through the opening window portion 6*b* in the light source chamber so as to receive light from the paper sheet. In this example, an above portion of the opening window portion 6*b* of the respective chambers divided with the partition plate 6*a* is covered with a transparent body 6*c* such as glass which allows ultraviolet ray and visible light to pass through. A slope is provided at an entering side of a paper sheet in the transparent body 6*c*. The sensor unit 10*a* is mounted on the transportation path through a mounting member 6*d* so that a top face of the transparent body 6*c* is a part of the path.

In the window portion of the light source chamber, an optical filter 3 for allowing ultraviolet ray range to pass through is attached and in window portion of the fluorescence detecting chamber, an optical filter 4 for allowing visible light range to pass through is attached. According to a preferred embodiment, a blue color component filter (hereinafter referred to as "blue filter") is applied as the optical filter 3 and a filter having a color matching with the color of fluorescence which should be detected (red, orange, yellow and so on) is applied as the optical filter 4. For example, by attaching a seal-type filter or providing the opening window portion with such a filter detachably, each filter is provided at each window portion so that it can be replaced. In this example, red fluorescence is a detection object and a filter which allows fluorescence of red color component (about 600 nm to about 770 nm in wavelength) to pass through (hereinafter referred to as "red filter") is attached to the window portion on the fluorescence detecting side.

A light source portion 1 comprising an ultraviolet ray LED 1*a* for emitting ultraviolet ray and an ultraviolet ray monitor (monitor sensor for receiving ultraviolet ray) 1*b* are provided in the light source chamber. The ultraviolet ray LED 1*a* is disposed such that its optical axis is inclined at a predetermined angle with respect to the transportation path so that a position on a straight line in which a face of the partition plate 6*a* dividing to the respective chambers and a top face of the transparent body 6*c* intersects each other (W=1.0 mm in FIG. 3 of this example) acts as a focal point. Then, an ultraviolet monitor 1*b* is disposed beside it at such a position in which it is capable of receiving both a direct light from the ultraviolet ray LED 1*a* and ultraviolet reflected and diffused ultraviolet light from the paper sheet as shown with arrows in FIG. 3 and output saturation never occurs. With this structure, detection of the light amount of the light source and detection of the ultraviolet reflected light are carried out with a single light receiving device.

On the other hand, a detection light detector 2 for receiving a light impinging through the opening window portion 6*b* is provided in the chamber on the fluorescence detection side. The detection light receiving portion 2 includes a fluorescence receiving sensor 2*a* (hereinafter referred to as "detecting sensor") for detecting light of wavelength including at least visible light region and detects light of the wavelength which is determined to allow to pass through by the filter 4. In this example, a rod lens 2*b* is provided and by converging light from the paper sheet through this rod lens 2*b*, a weak fluorescence can be detected. Meanwhile, although the rod lens 2*b* is attached for such a weak fluorescence, this may not be attached if a strong fluorescence can be obtained.

The aforementioned ultraviolet ray LED 1*a*, the ultraviolet monitor 1*b* and the fluorescence detecting sensor 2*a* are mounted on a common substrate 5 and signals from the respective light receiving sensors 1*b*, 2*a* are outputted through an I–V (current-voltage) converting circuit (not shown). According to this embodiment, as each of the ultraviolet monitor (monitor sensor) 1*b* and the fluorescence detecting sensor 2*a*, a photo diode having a rectangular light receiving face is employed and two ultraviolet ray LEDs 1*a* are provided in parallel. Data of a rectangular region perpendicular to the transportation direction A of the paper sheet is sampled.

Next, the ultraviolet ray LED, filter and light receiving sensors (ultraviolet monitor and detecting sensor) for use in the present invention will be described according to a concrete example.

Figure 4A:
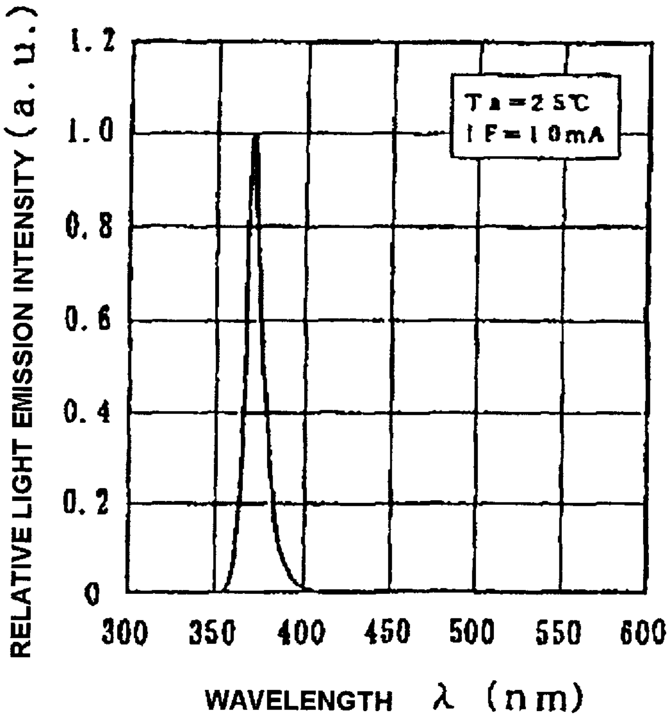
FIGS. 4A and 4B are diagrams showing the characteristic of a ultraviolet ray LED applied to the present invention.
Figure 4B:
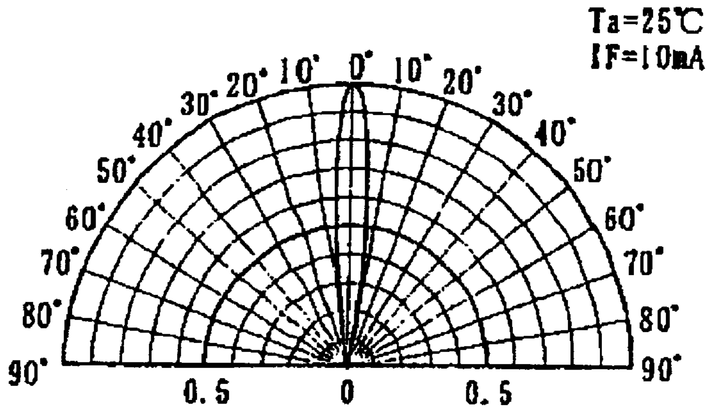

According to the present invention, an ultraviolet ray LED having an emission spectrum (emission wavelength is about 370 nm) as shown in FIG. 4A is employed as a light source which emits ultraviolet ray and the directional characteristic thereof is as shown in FIG. 4B. As a filter (blue filter 4) which allows ultraviolet ray from this ultraviolet ray LED to pass through, it is desirable to use a band pass filter having a maximum transmissibility at 370 nm corresponding to the characteristic of ultraviolet ray LED. Although as the filter provided in the window portion on the fluorescence detection side, a filter of a color corresponding to the color of fluorescence which should be detected is employed, in case of the red filter 4 of this embodiment, it is desirable to employ a band pass filter which allows visible light to pass through and has the maximum transmissibility near about 620 nm wavelength or a visible light transmission filter which allows light of about 620 nm to pass through.

Figure 5A:
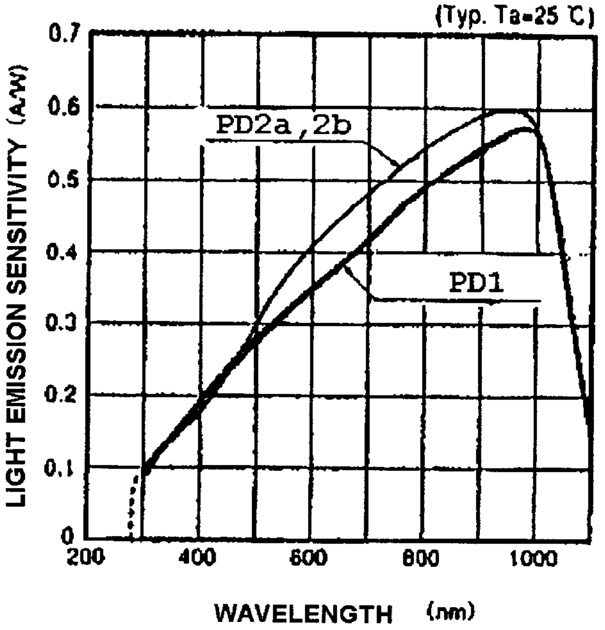
FIGS. 5A and 5B are diagrams showing the characteristic of the light receiving sensor applied to the present invention.
Figure 5B:
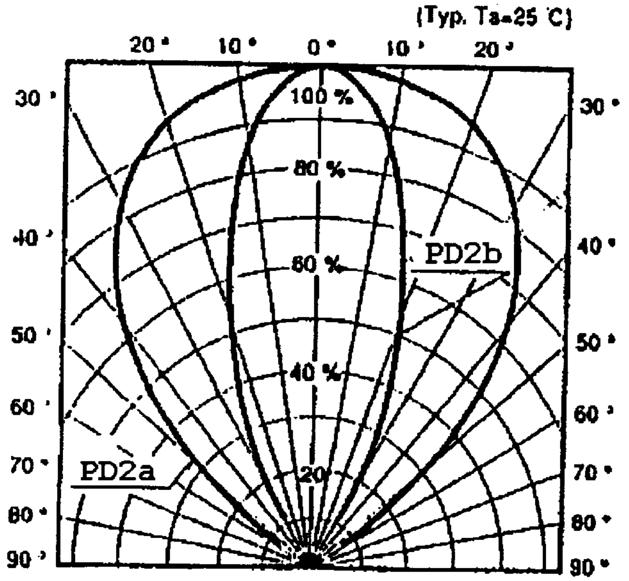

Because the fluorescence detecting sensor 2*a* for detecting fluorescence has a different spectral response character from the monitor sensor 1*b* for detecting ultraviolet ray, it is desirable to use a sensor suitable for each wavelength. For example, as the ultraviolet monitor 1*b*, it is desirable to use an ultraviolet reinforcing photo diode indicating a high sensitivity to light having emission wavelength (about 370 nm in this example) of the ultraviolet LED. However, because in this example, the fluorescence and ultraviolet ray of an appropriate wavelength from the object are received through each filter, it is permissible to use the same photo diode. In this case, it is desirable to employ a photo diode PD1 (or PD2*a*, PD2*b*) having a sensitivity characteristic of about 320–1100 nm (maximum sensitivity wavelength= about 960 nm) including emission wavelength region of ultraviolet ray LED as shown in FIG. 5A. Further, it is desirable to use a photo diode (the same figure indicates examples of PD2*a*, PD2*b*) having a directional characteristic shown in FIG. 5B. Meanwhile if the photo diode PD1 shown in FIG. 5A is employed, the light receiving sensitivity is 0.15 A/W for ultraviolet ray of 370 nm and 0.38 A/W for red light and infrared light.

As for the allocation of the ultraviolet ray monitor 1*b*, although, in the example shown in FIG. 3, the ultraviolet ray monitor 1*b* is provided at a place which is weak in emitted amount of the ultraviolet ray LED 1*a*, this can obtain a sufficient output as a monitor for emitted light amount because it is very near the ultraviolet ray emitting portion. Contrary to this, because the reflected light from the paper sheet is dispatched from a far distance, this monitor needs to be disposed in a direction excellent in its sensitivity. As a result, as the example FIG. 3, the monitor is preferred to be located at a position enabling both the reflected light from the paper sheet and a direct light from the light source to be received and allowing a compact structure ensuring an excellent sensitivity, the position being in the vicinity of the ultraviolet ray LED 1*a* and not causing the output of the photo diode to be saturated.

With the above-described structure, the operation of the optical path and sensing portion when ultraviolet ray is irradiated will be described with reference to FIG. 3.

In FIG. 3, the ultraviolet ray projected from the ultraviolet ray LED 1*a* impinges directly upon the ultraviolet ray monitor 1*b* so that the light amount is detected. Meanwhile, this detection of the light amount is carried out with no medium existing on the window portion or while a direct light from the ultraviolet ray LED 1*a* is entered into the ultraviolet ray monitor 1*b* but no reflected light from the paper sheet is entered. The ultraviolet ray passing through the blue filter 3 is reflected on the paper sheet at the focal point of the ultraviolet ray LED 1*a* while as for light impinging from the window portion on the ultraviolet ray projection side, its ultraviolet ray region passes through the blue filter 3 and then, the ultraviolet reflected diffused light from the paper sheet impinges upon the ultraviolet ray monitor 1*b* and is detected. On the other hand, as for light impinging through the window portion on the light receiving side from the paper sheet, its visible light region of an appropriate wavelength passes through the red filter 4 and is converged by the rod lens 2*b* and entered into the ultraviolet ray monitor 1*b*, so that the red fluorescence is detected.

Next, other example of the structure of the sensing portion in the UV/fluorescence detecting apparatus of the present invention will be described.

Figure 6:
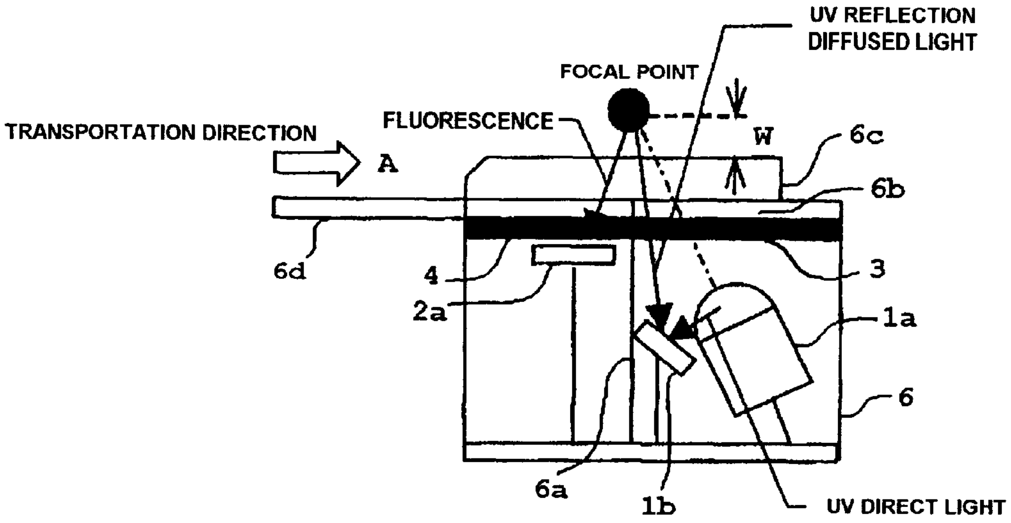
FIG. 6 is a schematic diagram showing a second example of the structure of the sensor portion in the UV/fluorescence detecting apparatus according to the present invention.

FIG. 6 shows a second example of the structure of the sensing portion, in which light through the red filter 4 from the paper sheet is received directly by the detecting sensor 2*a*. In this case, the detecting sensor 1*b* is disposed such that it adjoins the face of the opening window portion 6*b* (face of the red filter 4) as shown in FIG. 6 depending on the directional characteristic thereof. Meanwhile, other structure of the sensing portion is the same as the first example and therefore, a description thereof is omitted as the same reference numerals are attached. Although the detection accuracy is raised by adjusting the focal point on a medium face and sensor surface by means of the rod lens 2*b* as shown in the first example (see FIG. 3), the adjustment of the focal point is not necessary if a method of using a block value in a processing after the sampling is carried out.

Figure 7:
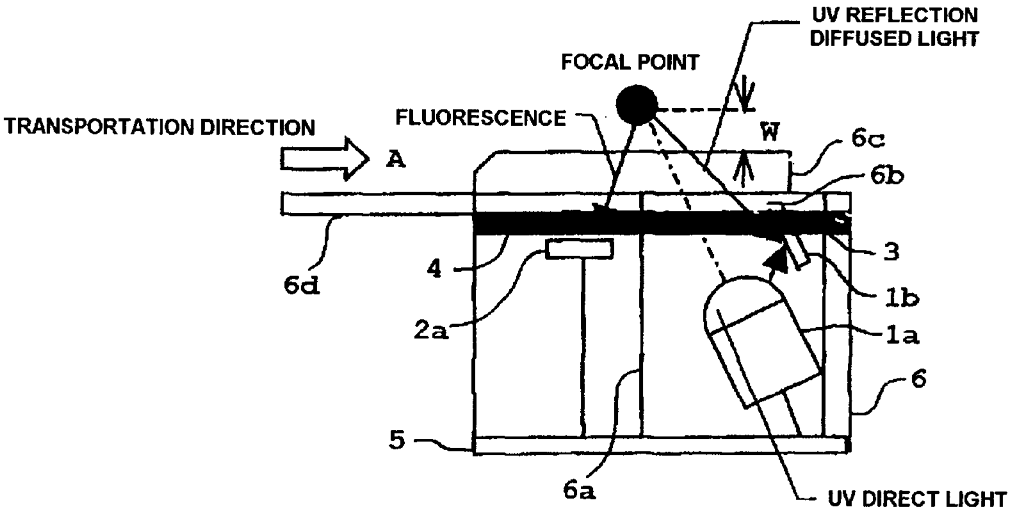
FIG. 7 is a schematic diagram showing a third example of the structure of the sensor portion in the UV/fluorescence detecting apparatus according to the present invention.

FIG. 7 shows a third example of the structure of the sensing portion, in which a light receiving face of the ultraviolet ray monitor 1*b* is disposed obliquely above the light emission portion of the ultraviolet ray LED 1*a*. As shown in the same figure, the ultraviolet ray monitor 1*b* is disposed not on the side of the partition plate 6*a* with respect to the optical axis of the ultraviolet ray LED 1*a* but on an opposite side to the partition plate 6*a*. Speaking in detail, as indicated with arrow paths in FIG. 7, the ultraviolet ray monitor 1*b* is disposed at a position which allows both the direct light from the ultraviolet ray LED 1*a* and the reflected light from the paper sheet to be received and causes no saturation of the output. In this case, in order to equalize the thickness of the unit case 6 to the first and second examples, part of the ultraviolet monitor 1*b* is inserted into an opening portion formed in the blue filter 4 and attached to a substrate on the side wall (or substrate 5 on the bottom with a relatively long lead wire). In this third example, as compared to the first and second examples, the ultraviolet ray monitor 1*b* can be provided at a place in which the light emission of the ultraviolet ray LED 1*a* is strong.

Figure 8A:
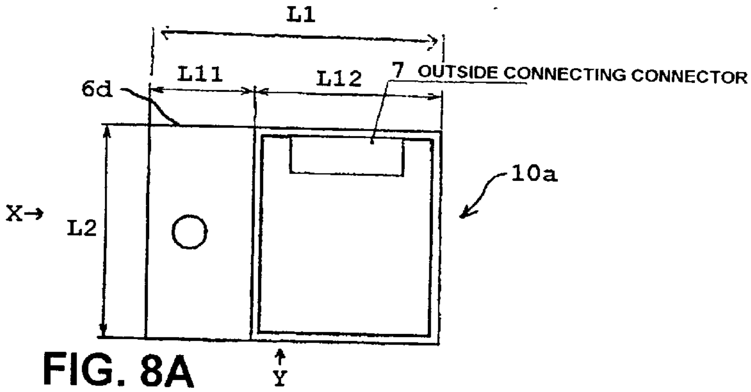
FIGS. 8A to 8D are diagrams showing an appearance of a sensor unit according to the present invention.
Figure 8B:
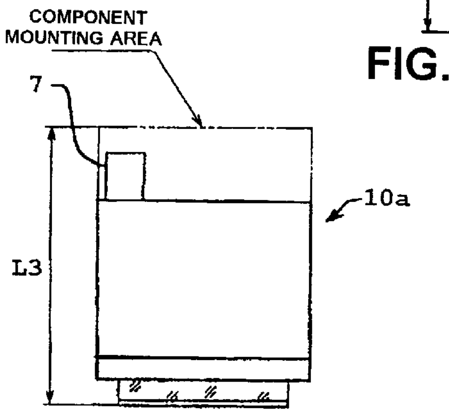
Figure 8C:
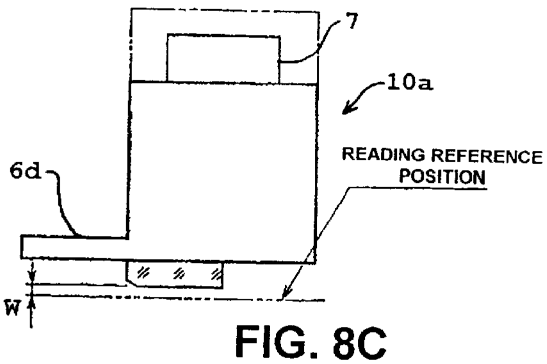
Figure 8D:
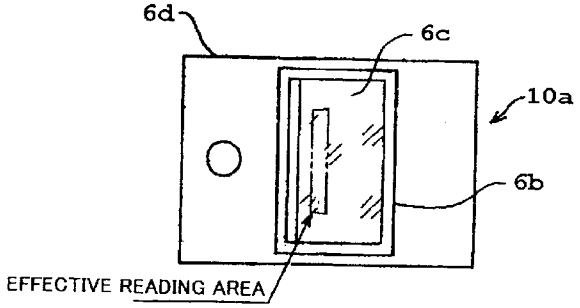

FIGS. 8A–8D show an appearance of the sensing unit exemplified in the first-third examples. FIG. 8A is a plan view of the sensing unit 10*a* seen from the bottom, FIG. 8B is a side view of the FIG. 8A seen from the direction of an arrow X, FIG. 8C is a side view of the FIG. 8A seen from the direction of an arrow Y and FIG. 8D is a plan view seen from a top face (window portion side). The sensor unit 10*a* is connected to an external unit through an outside connecting connector 7. As for the sizes (part mounting area) of the sensor unit 10*a*, L1=27.5 mm (L11=10 mm, L12=17.5 mm), L2=20 mm, L3=26.7 mm. The transparent body 6*c* provided on the opening window portion 6*b* is 16×9 mm while its reading effective range is 10×1.5 mm. Thus, the sensor unit mounting space is about 27.5×20×26.7 mm, which is quite compacter than a conventional sensor unit (a mounting space of a conventional example reduced in size is, for example, about 55×34×17.2 mm) using a cold cathode as its light emitting body. Meanwhile, the size of the opening window portion 6*b*, size of the reading effective range and the like are not restricted to the above described examples.

Next, the circuit structure of the UV/fluorescence detecting apparatus provided with the above-described sensor unit will be described.

Figure 9:
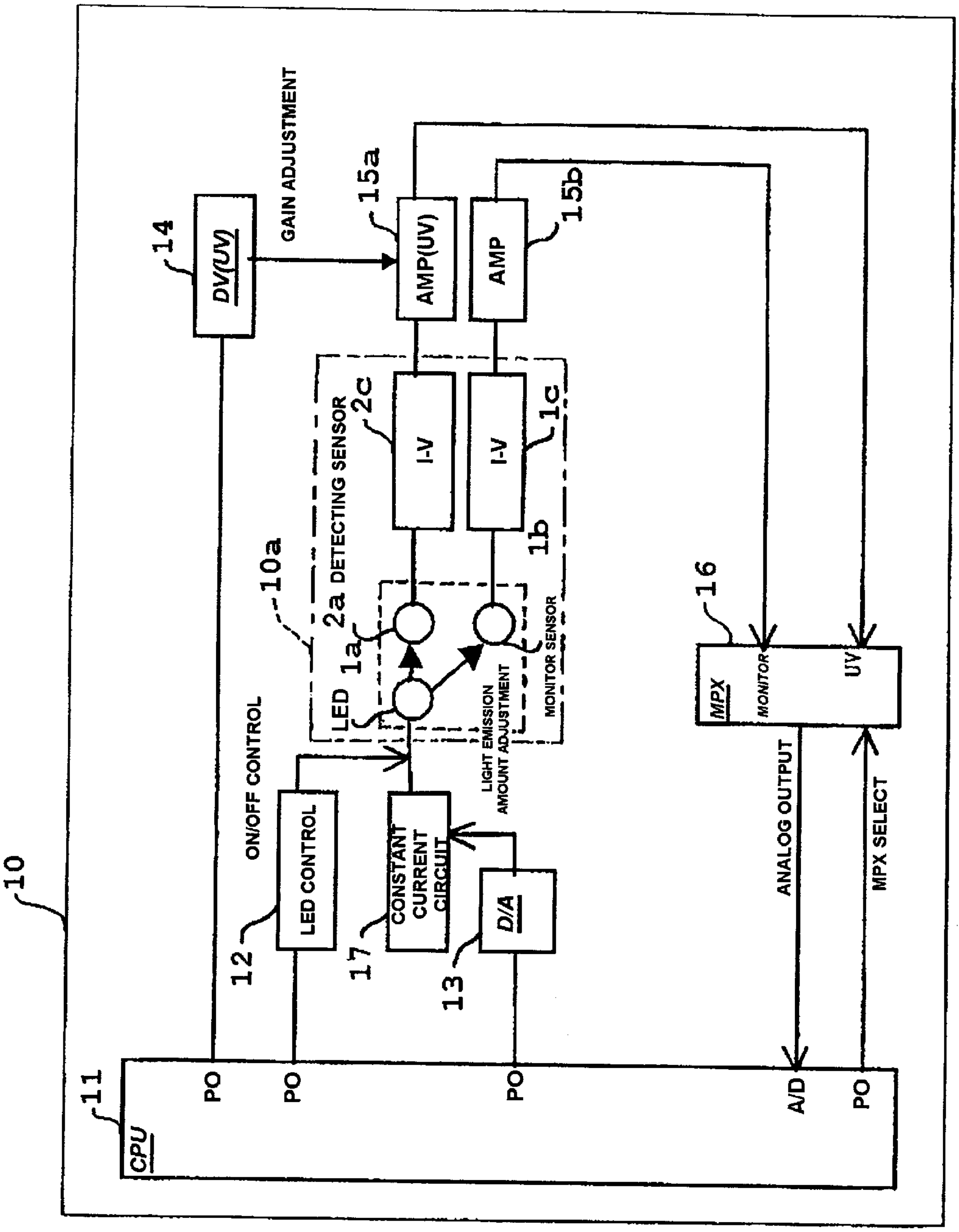
FIG. 9 is a block diagram showing an example of the circuit structure of the UV/fluorescence detecting apparatus according to the present invention.

FIG. 9 shows an example of the circuit structure of the UV/fluorescence detecting apparatus and in this example, an area indicated by reference numeral 10*a* is a circuit accommodated in the sensor unit. In FIG. 9, an LED control circuit 12 for ON/OFF control on the ultraviolet ray LED 1*a*, a D/A converter 13, a gain adjusting circuit 14 for carrying out gain adjustment in the detecting sensor 2*a* and a multiplexer (MPX) 16 for switching the outputs of the ultraviolet ray monitor 1*b* and the detecting sensor 2*a* are connected to the output port of a CPU 11 mounted on the UV/fluorescence detecting apparatus 10. A constant current circuit 17 is connected to the output of the D/A converter 13 so as to adjust the light emission amount of the ultraviolet ray LED 1*a* through this constant current circuit 17. After the output of the ultraviolet ray monitor 1*b* and the output of the detecting sensor 2*a* (each outputs of the I–V converting circuits 1*c* and 2*c*) are amplified by the amplifiers 15*a* and 15*b*, these outputs pass through the multiplexer 16 and are A/D converted and inputted into the CPU, wherein A/D converter is disposed in the CPU 11,.

Figure 10:
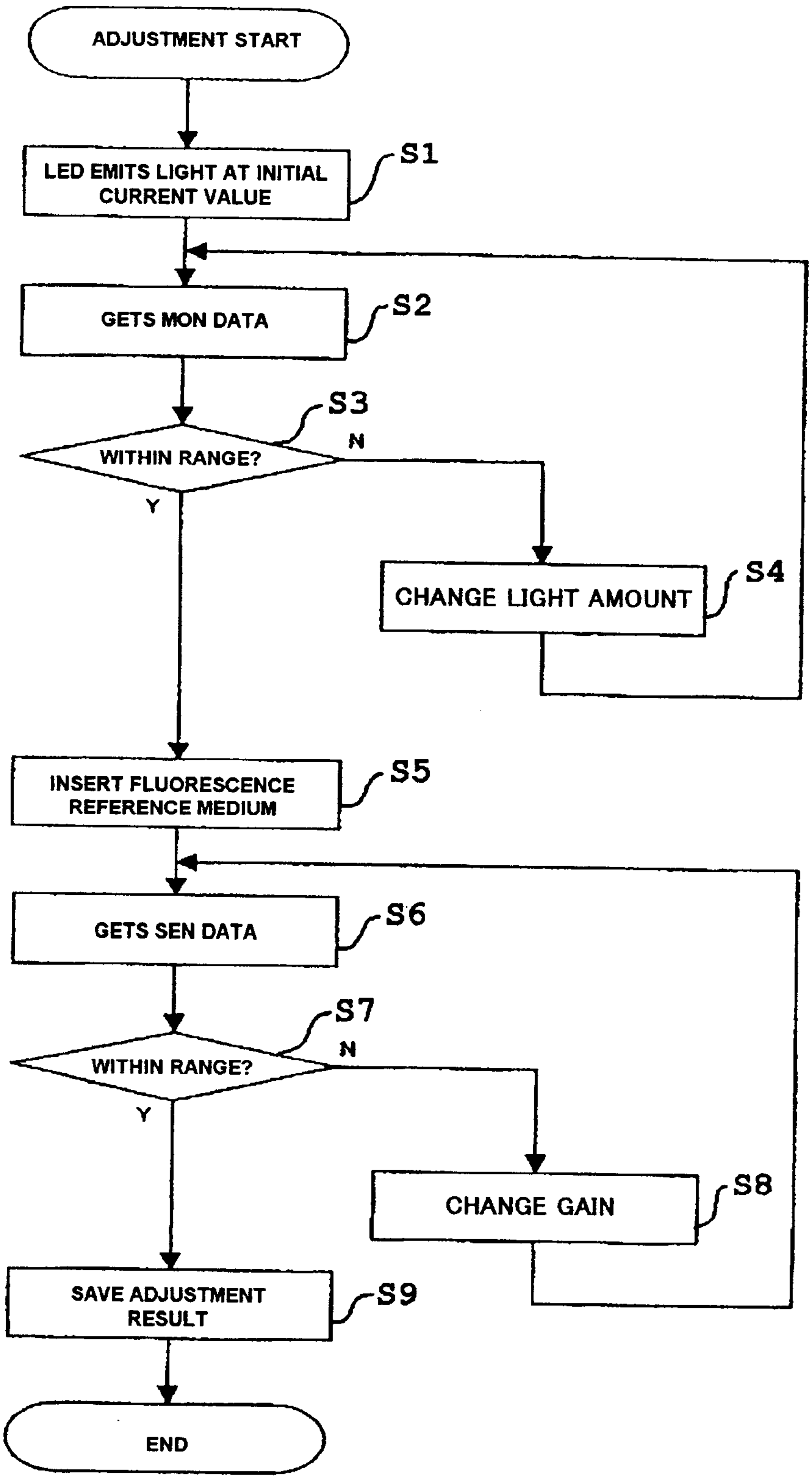
FIG. 10 is a flow chart for explaining an operation example upon adjustment of the sensor unit.
Figure 11:
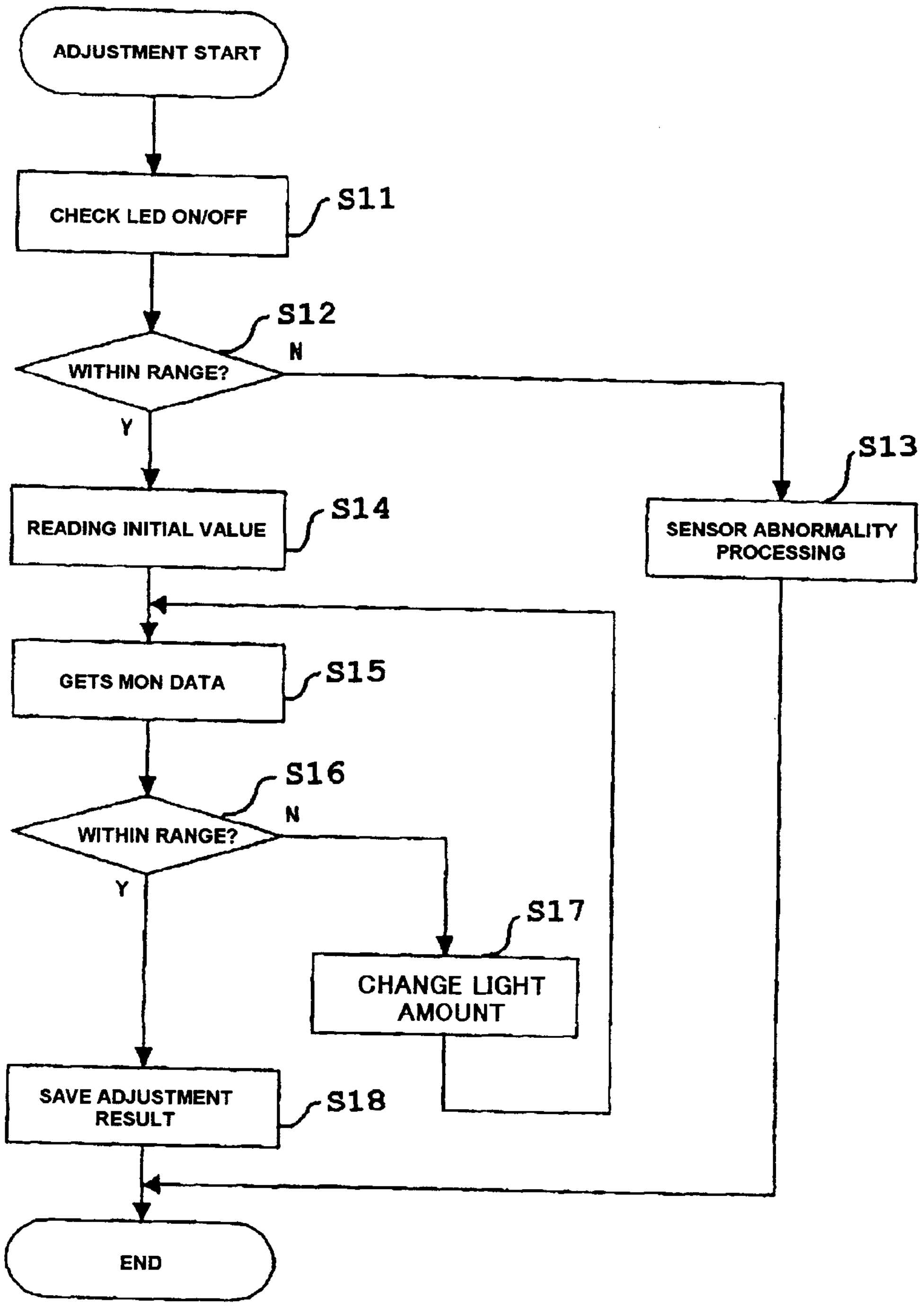
FIG. 11 is a flow chart for explaining an operation example upon adjustment of ultraviolet ray emission amount.

With the above described structure, an example of the operation of the UV/fluorescence detecting apparatus will be described. First, an example of the operation upon adjustment of the sensor unit, which is carried out prior to shipment will be described with reference to a flow chart shown in FIG. 10.

Upon adjustment of the sensor unit, current is supplied at a predetermined initial current value (10 mA in this example) without any medium (detection object) so as to emit the ultraviolet ray LED 1*a* (Step S1). Output data (MON data) of the ultraviolet monitor 1*b* is collected (Step S2). Then, whether or not the output value of the ultraviolet ray monitor 1*b* is within a reference value range (reference voltage Va±α: 2.3±0.05V in this example) is determined (Step S3) and if it is out of the range, the light emission amount of the ultraviolet ray LED 1*a* is adjusted through the constant current circuit 17 so as to be within the reference value range (Step S4). Then, if the output value is within the reference value range, a fluorescence reference medium is placed on the light receiving window portion of the sensor unit so as to obtain data (SEN data) of the detecting sensor 2*a* (Steps S5 and S6). Whether or not the output value is within the reference value range (reference voltage Vb±β: 3.0±0.05V in this example) is determined (Step S7) and if it is out of the reference value range, gain adjustment is carried out through the gain adjusting circuit 14 so that the output value of the ultraviolet ray LED 1*a* is within the reference value range (Step S8). If it is within the reference value range, an adjusted result is stored (Step S9) and the adjustment processing prior to shipment is terminated.

Next, an example of the operation upon adjustment of the emitted amount of the ultraviolet ray at the time of actual operation will be described with reference to a flow chart shown in FIG. 9.

When the UV/fluorescence detecting apparatus is in standby, first, the reference current is supplied at a predetermined interval so as to turn ON/OFF the ultraviolet ray LED 1*a* (Step S11) and then, ON/OFF is confirmed. At the same time, whether or not the output of the ultraviolet ray monitor 1*b* is within the range of ON/OFF confirmation reference value is determined (Step S12). If it is out of the range, it is determined that the sensor is abnormal and then, processing against abnormality such as alarm sounding is carried out and the adjustment operation is terminated (Step S13). If it is within the range in the aforementioned Step S12, an initial value is read (Step S14). Then, the ultraviolet ray LED 1*a* is turned ON without any medium so as to obtain output data (MON data) of the ultraviolet ray monitor 1*b* (Step S15) and whether or not the output value is within the reference value range (reference voltage Va±α: 2.3±0.05V in this example) is determined (Step S16). If it is out of the range, the light emission amount of the ultraviolet ray LED 1*a* is adjusted to be within the reference value range through the constant current circuit 17 (Step S17). If the output value is within the reference value range, MON data (data of direct light) after the above-described adjustment is set up as a correction value at the time of sampling the reflected ultraviolet ray and an adjusted result is stored (Step S18) and then the adjustment processing at the waiting time is terminated.

Figure 12:
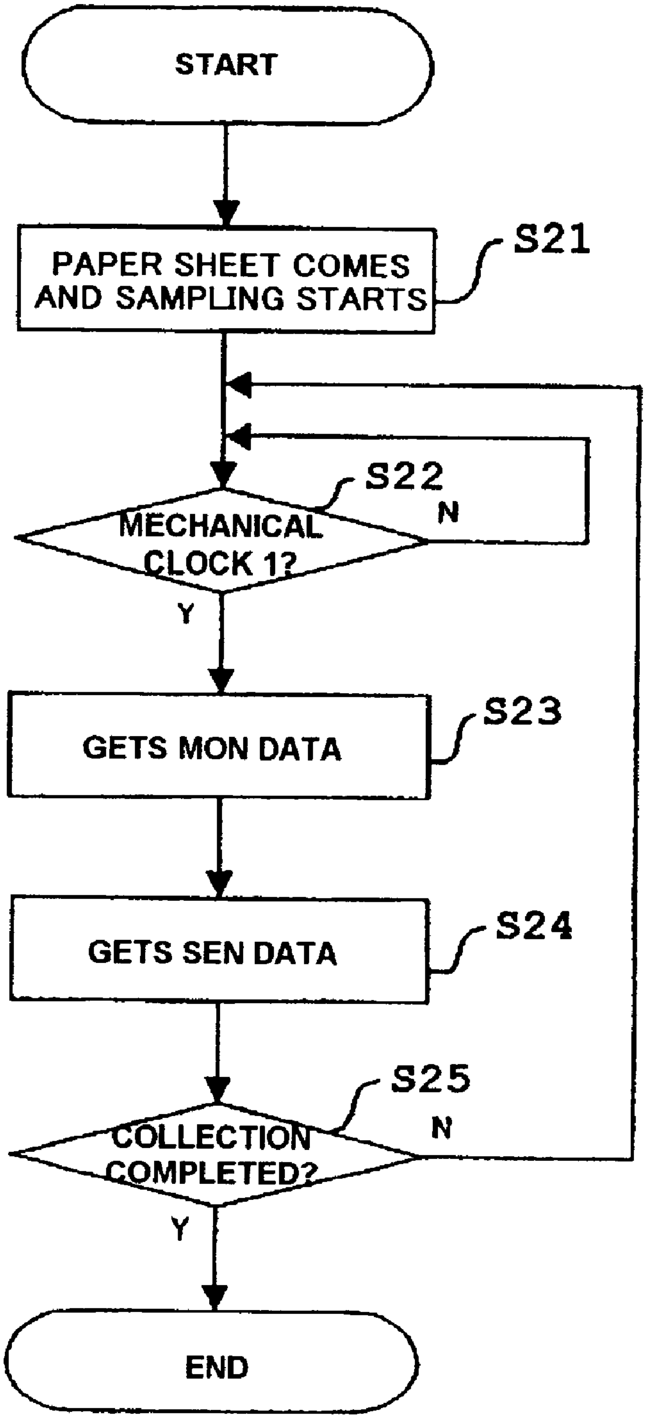
FIG. 12 is a flow chart f or explaining an operation example upon data sampling about the paper sheet.

Next, an example of the operation upon data sampling about a paper sheet will be described with reference to a flow chart shown in FIG. 12. Meanwhile, although a case where data about a single paper sheet is sampled will be described, the operation for each paper sheet even if papers are transported continuously is the same.

The UV/fluorescence detecting apparatus starts the sampling operation by detecting a coming of the paper sheet into the window portion of the sensor unit (Step S21). When a mechanical clock, which is a pulse synchronous with transportation over a predetermined distance is inputted, a control pulse is generated, so that detecting data at each predetermined transported distance of the paper sheet (relative moving distance) is sampled. That is, whether or not the mechanical clock is "1" as the result of detection of paper sheet invasion is determined (Step S22). If it is "1", the sensor output is changed over by the multiplexer (MPX) 15, and data of the detecting sensor 2*a* and data of the ultraviolet ray monitor 1*b* are sampled. In this sample, as indicated with the sensor structure of FIG. 3, the paper sheet goes in the direction of an arrow A and it passes the window portions on the fluorescence detection side and ultraviolet reflected light detection side, so that data of part of the paper sheet is sampled with the respective sensors 2*a*, 1*b* in succession (Steps S23 and S24). Then, whether or not collection of data of the predetermined sampling number is completed is determined (Step S25). If it is not completed, the processing proceeds to the aforementioned Step S22, in which the sampling processing of each transportation of predetermined distance is repeated. If it is determined that the collection of data is completed in the Step S25, the data sampling processing for the paper sheet is terminated.

Figure 13:
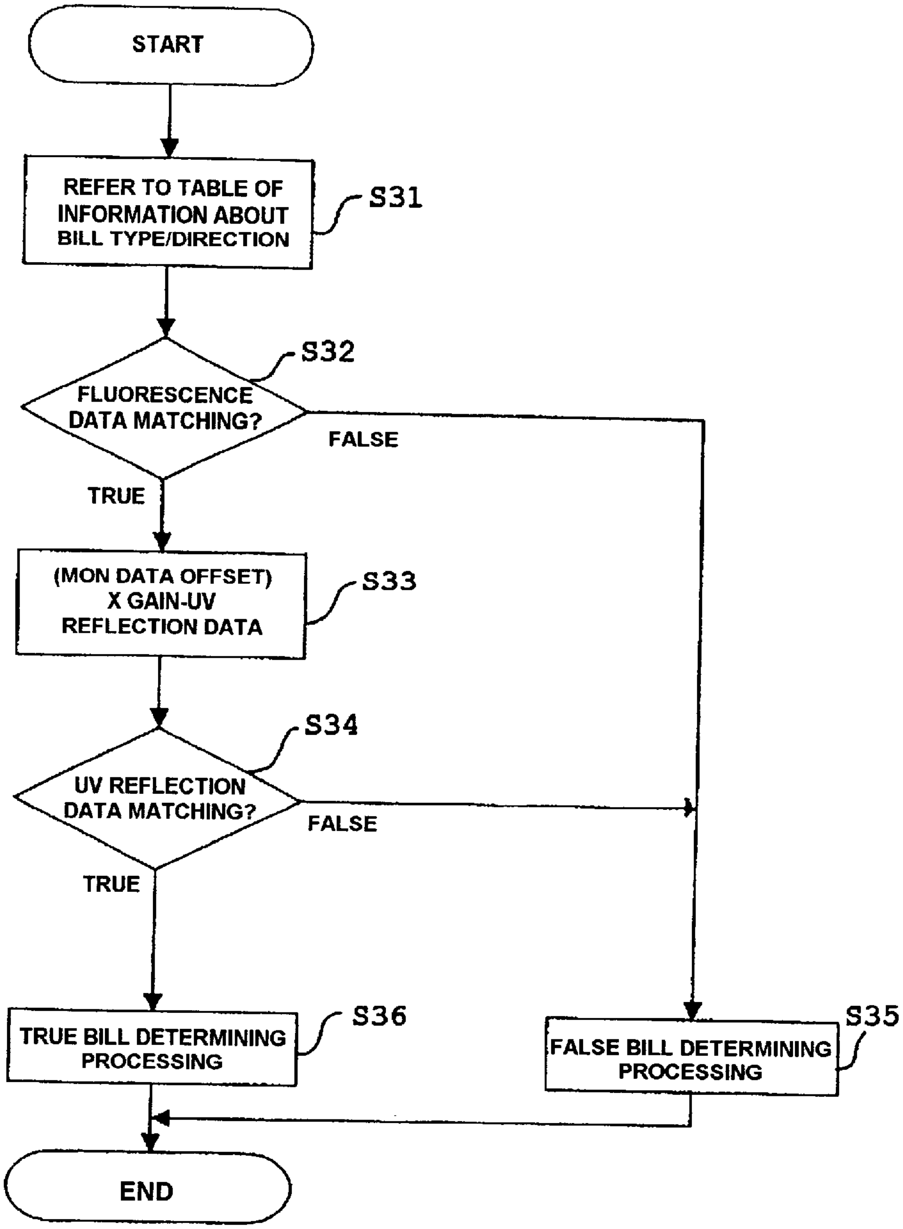
FIG. 13 is a flow chart for explaining an operation example upon identification processing using sampling data.

Next, an example of operation upon identification processing using the aforementioned sampling data will be described along a succession of a flow chart of FIG. 13. Meanwhile, a case where determining the truth/falsehood of a bill (money) containing fluorescent material is carried out with the UV/fluorescence detecting apparatus will be described.

First, by referring to a table in which reference data is registered for each bill direction and bill type (Step S31), the reference data on the wavelength (fluorescence of a color corresponding to a filter color) of a true bill of the denomination is verified with the sampled fluorescence data. For example, by discriminating a fluorescent pattern and the like by comparing each fluorescence sample value with an appropriate reference value, the authenticity of the bill is judged (Step S32). If it is determined that the bill is true, with an adjustment value (data about direct light in the condition in which there is no medium) set up at the waiting time as an offset value and the previously described gain adjustment result value as a gain value, ultraviolet reflected data is obtained according to the following expression (1) (Step S33). Then, by comparing it with the reference data (generation amount, position, pattern and the like of ultraviolet ray), whether or not the bill is true is determined (Step S34).

$$\text{Ultraviolet reflection data}=(\text{ultraviolet ray data}-\text{offset})\times\text{gain} \quad (1)$$

If it is determined that the bill is false in the above Step S32 or Step S34, false bill determining process (Step S35) for that paper sheet is carried out according to preliminarily registered false bill data using fluorescence data and ultraviolet reflection data. If it is determined that the bill is true in the Step S34, true bill determining process (Step S36) is carried out using detection information of other sensors (image sensor, magnetic sensor or the like) and then, the true bill authentication processing for that bill is terminated.

Meanwhile, the above-described true/false bill determining processing is carried out depending on the kind of the true/false bill. For example, the paper sheet using the characteristic upon ultraviolet ray irradiation in order to prevent forgery and doctoring includes a case where a special paper is used to prevent fluorescence from being emitted even if it is irradiated (US dollars and the like), a case where ultraviolet ray is reflected at only a predetermined position, a case where a specific pattern is printed using fluorescent ink and the like. As the forged bill found in the U.S., there are well known a type which when irradiated with ultraviolet ray, reflects ultraviolet ray of a low level while emitting fluorescence, a type which reflects ultraviolet ray of a low level while having the characteristic of not emitting fluorescence (forged bill made by color copy), a type which reflects ultraviolet ray of a high level while having the characteristic of emitting fluorescence, a type which reflects ultraviolet ray of a high level while having the characteristic of not emitting fluorescence (forged bill made of a high quality paper) and the like.

When examining truth/falsehood, individual truth/falsehood examination is carried out based on each characteristic by using reflecting characteristic of ultraviolet ray and fluorescence generation characteristic and then, the truth/falsehood examination is carried out by combining both the characteristics. Then, by using the reference data about the true bill and the reference data about the false bill, the truth/falsehood of the paper sheet of various kinds is determined.

Although in the above embodiment, the paper sheet on which valuable information is printed has been picked up as an example for the description, the present invention is not restricted to securities such as bill and check, however, it can be applied to a certifying apparatus for a document of other type requiring certification (including paper attached with seal or the like and paper written by stamp, sign or the like) and also a system in which detecting information is transmitted from a UV/fluorescence detecting apparatus to a host computer through communication network and processed. Although a case where the filter is employed is described here, it is permissible to use an ultraviolet ray receiving sensor which does not respond to light of a wavelength longer than that (370 nm in the embodiment) of light emitted by the ultraviolet ray LED without any filter or a fluorescence receiving sensor which does not respond to light shorter than the above described wavelength. In this case, like in the above described embodiment, it is desired to have a structure which allows its filter to be replaced with a filter of the color corresponding to light of a wavelength which should be detected, so that fluorescence of various colors can be detected in the same apparatus.

Because the present invention achieves a small and compact sensor structure by using an LED as an ultraviolet ray emitting body and reducing the quantity of peripheral circuits, a small, cheap UV/fluorescence detecting apparatus can be provided. Speaking in detail, following effects are provided.

Because the ultraviolet ray monitor is disposed beside the UV emitting device (ultraviolet ray LED) so as to be capable of receiving a direct light from the UV emitting device and a ultraviolet ray reflected by a detection object, monitoring of the light amount of a light source and detection of ultraviolet reflected light can be carried out with a single light receiving device. Thus, reflected light intensity of ultraviolet ray reflected by the paper sheet can be detected by an ultraviolet ray monitor so as to achieve reduction in the size and price of the sensor unit. Further, because the light source portion including the ultraviolet ray monitor and the detection light receiving portion are partitioned with the partition wall and visible light region thereof is received through the window portion in a chamber on the detection light receiving side, the visible light can be also detected independently.

Further, because the LED is employed as the UV emitting device, an inverter power supply using the cold cathode is not required, and therefore, no unnecessary noise is generated from the light source and no heat is generated. The service life is shorter than a conventional type using the cold cathode. Although the cold cathode is not capable of securing a predetermined amount of light emission unless the temperature of that tube increases to a predetermined temperature, the ultraviolet ray LED attains sufficient brightness early after it is powered on. Thus, the control is simplified and its driving circuit is also simplified, thereby achieving a low cost of the UV/fluorescence detecting apparatus. Further, by providing with a filter having a color corresponding to the color of light which should be detected, as a filter in the window portion on the detection light receiving side, attenuating at a specific wavelength (specific color) is decreased, so that light (fluorescence) of an appropriate wavelength can be detected securely.

What is claimed is:

1. A UV/fluorescence detecting apparatus including a sensor unit comprising:

- a light source portion including an ultraviolet ray LED for emitting ultraviolet ray through an opening window portion and an ultraviolet ray monitor provided beside the ultraviolet ray LED;
- a light detector portion disposed in a chamber partitioned with a partition plate for receiving an incident light impinging through the opening window portion;
- a partition plate for partitioning between said light source portion and said detection light receiving portion;
- a transparent body provided on said both opening window portions;
- a first filter provided in a window portion on projection side of said ultraviolet ray for allowing an ultraviolet ray region thereof to pass through; and
- a second filter provided in a window portion on light receiving side of said incident light for allowing a visible light region thereof to pass through.

2. A UV/fluorescence detecting apparatus as claimed in claim 1, wherein said ultraviolet ray monitor is disposed at a position where it receives both a direct light of said ultraviolet ray and an ultraviolet ray reflected by an object for detecting a light emission amount of said ultraviolet ray and an ultraviolet ray reflected by said object.

3. A UV/fluorescence detecting apparatus as claimed in claim 1 or 2, wherein said light detector portion detects a light of wavelength determined to pass through by said second filter.

4. A UV/fluorescence detecting apparatus as claimed in claim 1, wherein a blue filter is attached to the window portion on said light projection side as said first filter while a red filter is attached to the window portion on said light receiving side as said second filter.

5. A UV/fluorescence detecting apparatus as claimed in claim 2, wherein a blue filter is attached to the window portion on said light projection side as said first filter while a red filter is attached to the window portion on said light receiving side as said second filter.

6. A UV/fluorescence detecting apparatus as claimed in claim 1, wherein said second filter is provided so as to be replaceable with a filter of the color corresponding to the light of the color which should be detected.

7. A UV/fluorescence detecting apparatus as claimed in claim 2, wherein said second filter is provided so as to be replaceable with a filter of the color corresponding to light of color which should be detected.

8. A UV/fluorescence detecting apparatus as claimed in claim 2, wherein said object is a bill.

9. A UV/fluorescence detecting apparatus as claimed in claim 1, wherein said transparent body is made by glass.

10. A UV/fluorescence detecting apparatus as claimed in claim 4, wherein said blue filter is a band pass filter having a maximum transmissibility at 370 nm, and said red filter is a band pass filter which allows visible light to pass through and has a maximum transmissibility near about 620 nm or is a visible light transmission filter which allows light of about 620 nm to pass through.

11. A UV/fluorescence detecting apparatus as claimed in claim 1, wherein said light detector portion is a photo diode having a sensitivity characteristic of the wavelength about 320–1100 nm.

12. A sensing method of a UV/fluorescence detecting apparatus comprising a light source including an ultraviolet ray LED for emitting ultraviolet ray through a window portion and an ultraviolet ray monitor provided beside the ultraviolet ray LED at a position for receiving both a direct light of said ultraviolet ray and an ultraviolet ray reflected by the surface of a paper sheet and a light detecting sensor for receiving incident light impinging through a window portion of a chamber partitioned with a partition plate from said light source portion, said sensing method comprising:

- setting an initial UV light emission amount using said ultraviolet ray monitor;
- reading and memorizing a set value at a waiting time read by said ultraviolet ray monitor;
- moving a unit having said sensing portion relative to the surface of a paper sheet;
- sampling visible light with said light receiving sensor;
- sampling ultraviolet ray with a sensor in said ultraviolet ray monitor; and
- processing as an ultraviolet ray reflected by the surface of said paper sheet by subtracting the set value at said waiting time from the sample value of the ultraviolet ray.

* * * * *